United States Patent [19]

Borromeo

[11] Patent Number: 4,693,627

[45] Date of Patent: Sep. 15, 1987

[54] DEVICE FOR FIXING THE SADDLE OF A BICYCLE TO A SADDLE PILLAR AND FOR ADJUSTING THE INCLINATION OF THE SADDLE

[75] Inventor: Lucio Borromeo, Turin, Italy

[73] Assignee: 3 T S.p.A., Turin, Italy

[21] Appl. No.: 876,155

[22] Filed: Jun. 19, 1986

[30] Foreign Application Priority Data

Jul. 26, 1985 [IT] Italy .................... 53642/85[U]

[51] Int. Cl.[4] .......................................... F16C 11/00
[52] U.S. Cl. ................................. 403/24; 403/390; 297/195
[58] Field of Search .............. 403/82, 87, 391, 390, 403/389, 206, 209, 213; 297/195

[56] References Cited

U.S. PATENT DOCUMENTS

| 568,802 | 10/1896 | Seaman | 403/390 |
|---|---|---|---|
| 596,699 | 6/1898 | Gurford | 403/82 |
| 2,884,476 | 4/1959 | Lock et al. | 403/206 X |
| 2,920,911 | 1/1960 | Campagnolo | 403/389 |
| 3,891,333 | 6/1975 | Corderac'k | 297/195 X |
| 3,933,391 | 1/1976 | Shook | 297/195 |
| 4,142,813 | 3/1979 | Laborde | 403/191 X |
| 4,155,590 | 6/1979 | Cunningham | 403/87 X |
| 4,180,345 | 12/1979 | Routens | 297/195 X |
| 4,275,922 | 6/1981 | Juy | 297/195 |
| 4,363,516 | 12/1982 | Braly et al. | 297/195 |
| 4,421,357 | 12/1983 | Shimano | 297/195 |
| 4,440,440 | 4/1984 | Juy | 297/195 |

FOREIGN PATENT DOCUMENTS 2398659 3/1979 France ..................... 297/195

Primary Examiner—Cornelius J. Husar
Assistant Examiner—Joseph A. Fischetti
Attorney, Agent, or Firm—Sughrue, Mion, Zinn, Macpeak and Seas

[57] ABSTRACT

The device comprises an abutment member which has seats for engaging the two rods of the saddle frame from above and is coupled to the head of the saddle pillar so as to be rotatable about a transverse axis of rotation perpendicular to the two rods but not movable vertically, and a thrust plate which engages the two rods of the saddle from below. A pair of screws is screwed substantially vertically through the head of the saddle pillar on the two sides of the transverse axis of rotation with their ends engaging the lower surface of the thrust plate, to cause clamping of the rods of the saddle against the seats of the abutment member as a result of the upward thrust exerted by the screws on the thrust plate, and to allow adjustment of the inclination of the saddle by the tightening of one of the screws and the loosening of the other.

6 Claims, 10 Drawing Figures

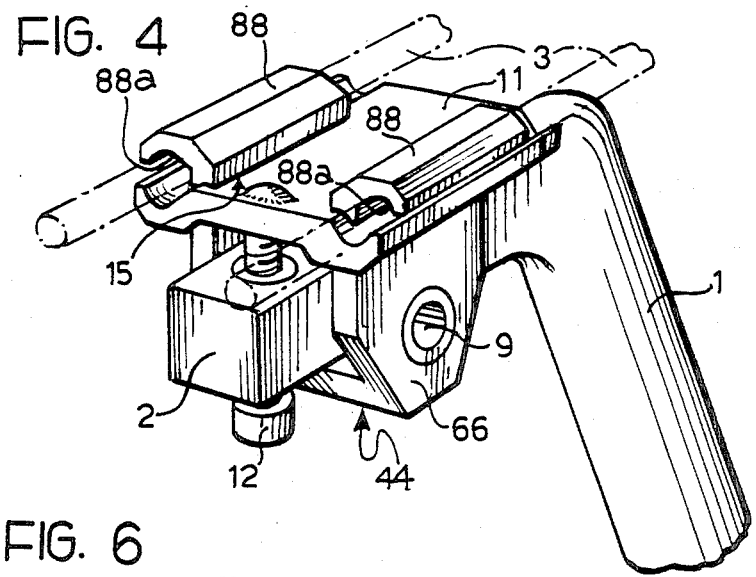
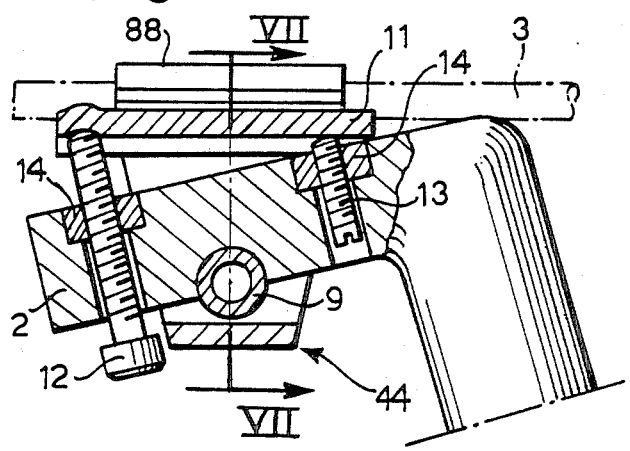
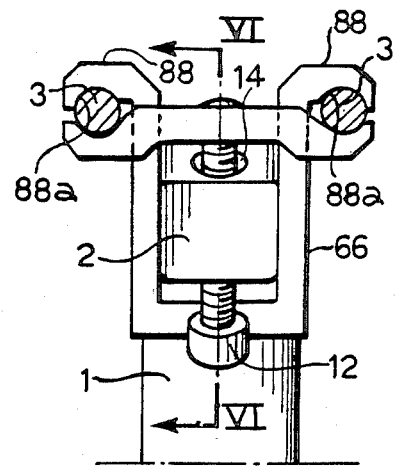
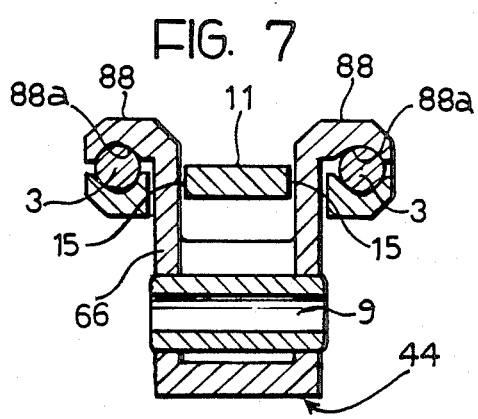

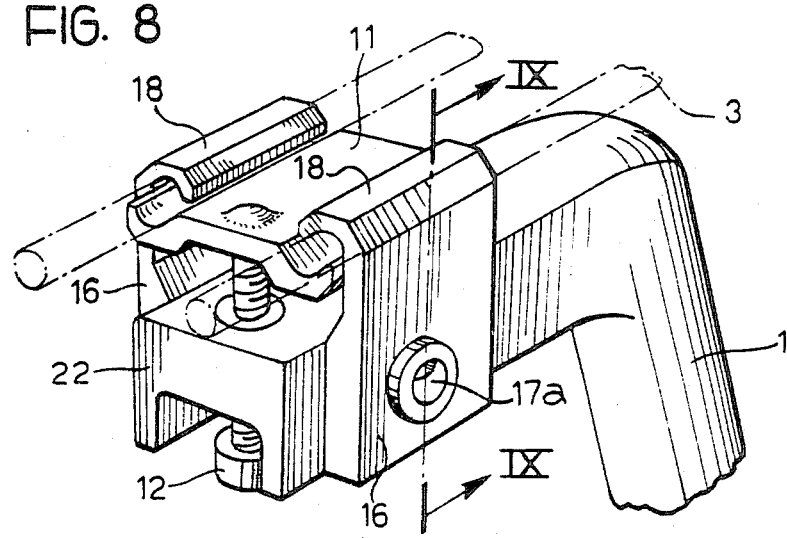
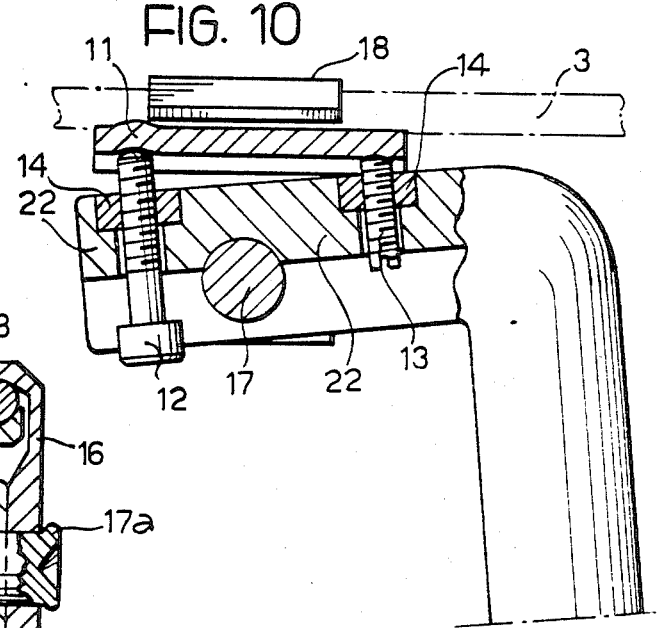
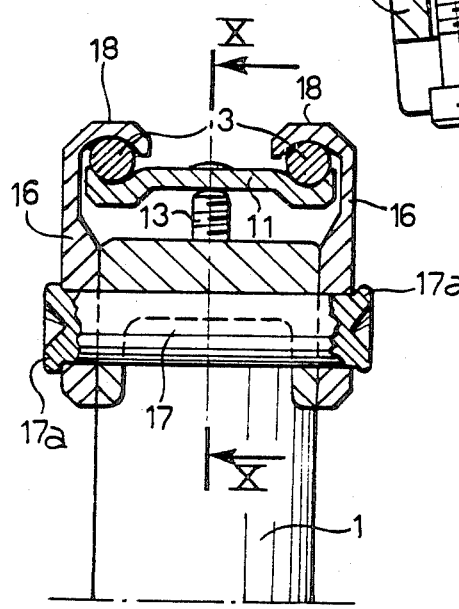

DEVICE FOR FIXING THE SADDLE OF A BICYCLE TO A SADDLE PILLAR AND FOR ADJUSTING THE INCLINATION OF THE SADDLE

The subject of the present invention is a device for fixing to the head of the saddle pillar of a bicycle a saddle whose frame comprises two longitudinal parallel, spaced-apart rods.

The main characteristic of the device of the present invention lies in the fact that it comprises:

an abutment member which has seats for engaging the two rods of the saddle from above and which is coupled to the head of the saddle pillar so as to be rotatable about a transverse axis of rotation perpendicular to the two rods but not movable vertically, a thrust plate which engages the two rods of the saddle, from below, and a pair of screws screwed substantially vertically through the head of the saddle pillar on the two sides of the transverse axis of rotation with their ends engaging the lower surface of the thrust plate, to cause clamping of the rods of the saddle against the seats of the abutment member as a result of the upward thrust exerted by the screws on the thrust plate, and to allow adjustment of the inclination of the saddle by the tightening of one of the screws and the loosening of the other.

BRIEF DESCRIPTION OF THE DRAWINGS

Further characteristics and advantages of the present invention will become apparent from the description which follows with reference to the appended drawings, in which:

FIG. 4 is a view similar to FIG. 1 of a first variant,

FIG. 5 is a side view taken on the arrow V of FIG. 4,

FIG. 6 is a section taken on the line VI—VI of FIG. 5,

FIG. 7 is a section taken on the line VII—VII of FIG. 6,

FIG. 8 is a perspective view similar to FIG. 1 of a second variant,

FIG. 9 is a section taken on the line IX—IX of FIG. 8, and

FIG. 10 is a section taken on the line X—X of FIG. 9.

DESCRIPTION OF THE PREFERRED EMBODIMENTS

Figure 1:
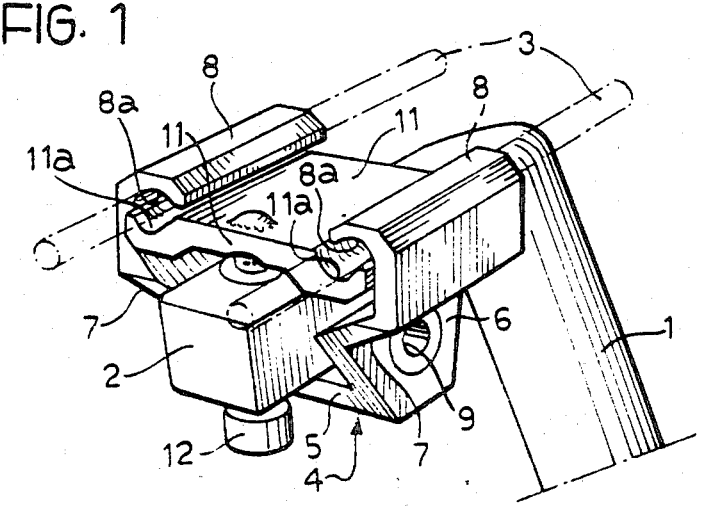
FIG. 1 is a perspective view of a device according to the present invention.

In the embodiment illustrated in FIG. 1, the saddle pillar of a bicycle is indicated 1 and has a head 2 extending in a cantilevered manner from its upper end.

Two longitudinal, parallel, spaced-apart rods 3 form part of the frame of a bicycle saddle, not shown in the drawings.

An abutment member, generally indicated 4, has the form of a bracket having a lower cross member 5 and two lateral arms which each comprise, starting from the cross member 5, a first straight portion 6 which extends in contact with one of the lateral faces of the head 2, a second portion 7 inclined outwardly, and an end portion 8 whose end is bent inwardly and has a seat 8a for one of the rods 3 of the saddle.

A cylindrical transverse pin 9 extends between the portions 6 of the abutment member 4 close to the cross member 5 and engages a corresponding cylindrical seat 10 formed in the lower face of the head 2 of the saddle pillar.

A thrust plate 11 has two seats 11a which engage the two rods 3 of the saddle from below.

Two screws 12 and 13 extend through the head 2 and are screwed into nuts 14 formed in the head 2 on the two sides of the pin 10.

The upper ends of the screws 12 and 13 engage the lower surface of the thrust plate 11 to thrust the plate 11 upwardly and thus clamp the rods 3 against the seats in the abutment member 4 which is prevented from moving vertically by the pin 10.

By tightening one of the screws 12, 13 and loosening the other, one can vary the inclination of the saddle as a result of the pivoting of the clamping device about the axis of the pin 10.

Figure 3:
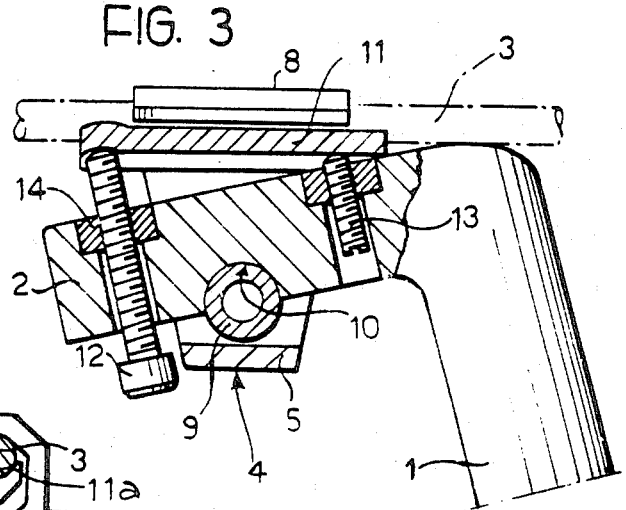
FIG. 3 is a cross-section taken on the line III—III of FIG. 2.
Figure 2:
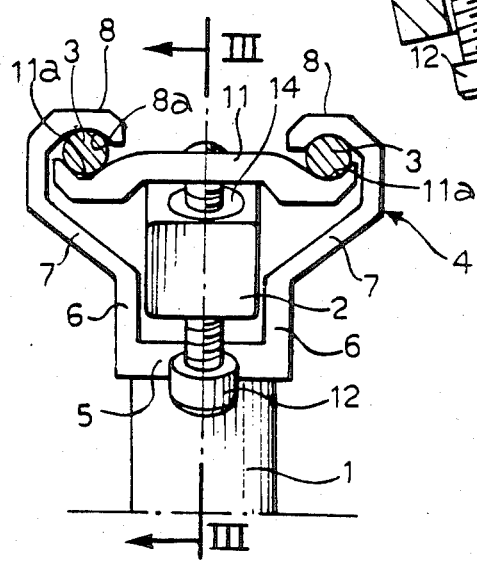
FIG. 2 is a front view taken on the arrow II of FIG. 1.

In the variant illustrated in FIGS. 4 to 7, the abutment member, generally indicated 44, differs from the one illustrated in FIGS. 1 to 3 in that the lateral arms of the bracket are constituted by two parallel plates 66 which extend partly in contact with the lateral faces of the head 2, passing through longitudinal slots 15 formed in the thrust plate 11 and each having an outwardly-bent end portion 88 with a seat 88a for one of the rods of the saddle.

In the variant illustrated in FIGS. 8 to 10, the head of the saddle pillar 1, indicated 22, has an inverted U-shaped cross-section and the abutment member is constituted by two plates 16 adjacent the lateral faces of the head 22 and connected together by a transverse articulation pin 17 which engages a cylindrical seat formed in the bottom of the U-shaped head and passes through two holes formed in the sides of the U.

The plates 16 each have a bent portion 18 with a seat for one of the rods 3 of the saddle.

In order to prevent the axial sliding of the pin 17, its ends are upset, as indicated at 17a in the drawing.

Alternatively, the pin 17 could be replaced by a resilient pin.

Naturally, he principle of the invention remaining the same, the constructional details and forms of embodiment may be varied widely with respect to that described and illustrated purely by way of non-limiting example, without thereby departing from the scope of the present utility model.

What is claimed is:

1. A device for fixing a saddle to a saddle pillar of a bicycle wherein said saddle is provided with a frame framing two longitudinal, parallel, spaced-apart rods, said device comprising:

an abutment member having seats for engaging the two rods of the saddle from above and which is coupled to the head of the saddle pillar so as to be rotatable about a transverse axis of rotation perpendicular to the two rods but not movable vertically, a thrust plate which engages the two rods of the saddle from below, a pair of screws threaded substantially vertically through the head of the saddle pillar on the opposite sides of said transverse axis of rotation with their ends engaging the lower surface of the thrust plate, to cause clamping of the rods of the saddle against the seats of the abutment member as a result of the upward thrust exerted by the screws on the thrust plate, and to allow adjustment of the inclination of the saddle by the tightening of one of the screws and the loosening of the other, said abutment member being in the form of a bracket having a cross member, means adjacent the cross member for engaging the lower surface of the saddle pillar with a rotatable coupling, and two lateral arms which each comprise, starting from the cross member:

a first straight portion which extends into contact with a respective lateral face of the head of the saddle pillar, a second outwardly inclined portion, and an end portion whose end is bent inwardly and carries a seat for a respective rod of the saddle frame, the thrust plate being disposed between the end portions of the two arms of the bracket.

2. A device according to claim 1 wherein the rotatable coupling means are constituted by a cylindrical transverse pin which extends between the lateral arms of the bracket close to the cross member, and a corresponding cylindrical seat formed in the lower face of the head of the saddle pillar and engaged by the pin.

3. A device for fixing a saddle to a saddle pillar of a bicycle wherein said saddle is provided with a frame having two longitudinal, parallel, spaced-apart rods, said device comprising:

an abutment member which has seats for engaging the two rods of the saddle from above and which is coupled to the head of the saddle pillar so as to be rotatable about a transverse axis of rotation perpendicular to the two rods but not movable vertically, a thrust plate which engages the two rods of the saddle from below, a pair of screws threaded substantially vertically through the head of the saddle pillar on the opposite sides of said transverse axis of rotation with their ends engaging the lower surface of the thrust plate, to cause clamping of the rods of the saddle against the seats of the abutment member as a result of the upward thrust exerted by the screws on the trust plate, and to allow adjustment of the inclination of the saddle by the tightening of one of the screws and the loosening of the other, said abutment member comprising:

two parallel plates, each of which extends partly in contact with a respective lateral face of the head of the saddle pillar, passes through a longitudinal slot formed in the thrust plate, and has an outwardly bent end portion with a seat for one of the rods of the saddle, a cylindrical transverse pin which extends between the lower portions of said two lateral plates, and a cylindrical seat being formed in the lower face of the head of the saddle pillar, said seat being engaged by said transverse pin.

4. A device for fixing a saddle to a saddle pillar of a bicycle wherein said saddle is provided with a frame having two longitudinal, parallel, spaced-apart rods, said device comprising:

an abutment member which has seats for engaging the two rods of the saddle from above and which is coupled to the head of the saddle pillar so as to be rotatable about a transverse axis of rotation perpendicular to the two rods but not movable vertically, a thrust plate which engages the two rods of the saddle from below, a pair of screws threaded substantially vertically through the head of the saddle pillar on opposite sides of said transverse axis of rotation with their ends engaging the lower surface of the thrust plate, to cause clamping of the rods of the saddle against the seats of the abutment member as a result of the upward thrust exerted by the screws on the thrust plate, and to allow adjustment of the inclination of the saddle by the tightening of one of the screws and the loosening of the other, the head of the saddle pillar having an inverted U-shaped cross section and defining a cylindrical seat in its bottom and two holes in the sides of its U;

the abutment member being constituted by two plates adjacent the lateral faces of the head, each plate having an inwardly bent part with a seat for a respective rod of the saddle frame, and a transverse articulation pin interconnecting the two plates of the abutment member, the pin engaging the seat in the bottom of the head and passing through the two holes in the sides thereof.

5. A device according to claim 4 wherein the articulation pin has upset ends for preventing its longitudinal sliding relative to the abutment member.

6. A device according to claim 4 wherein the articulation pin is constituted by a resilient pin.

* * * * *